UNITED STATES PATENT OFFICE.

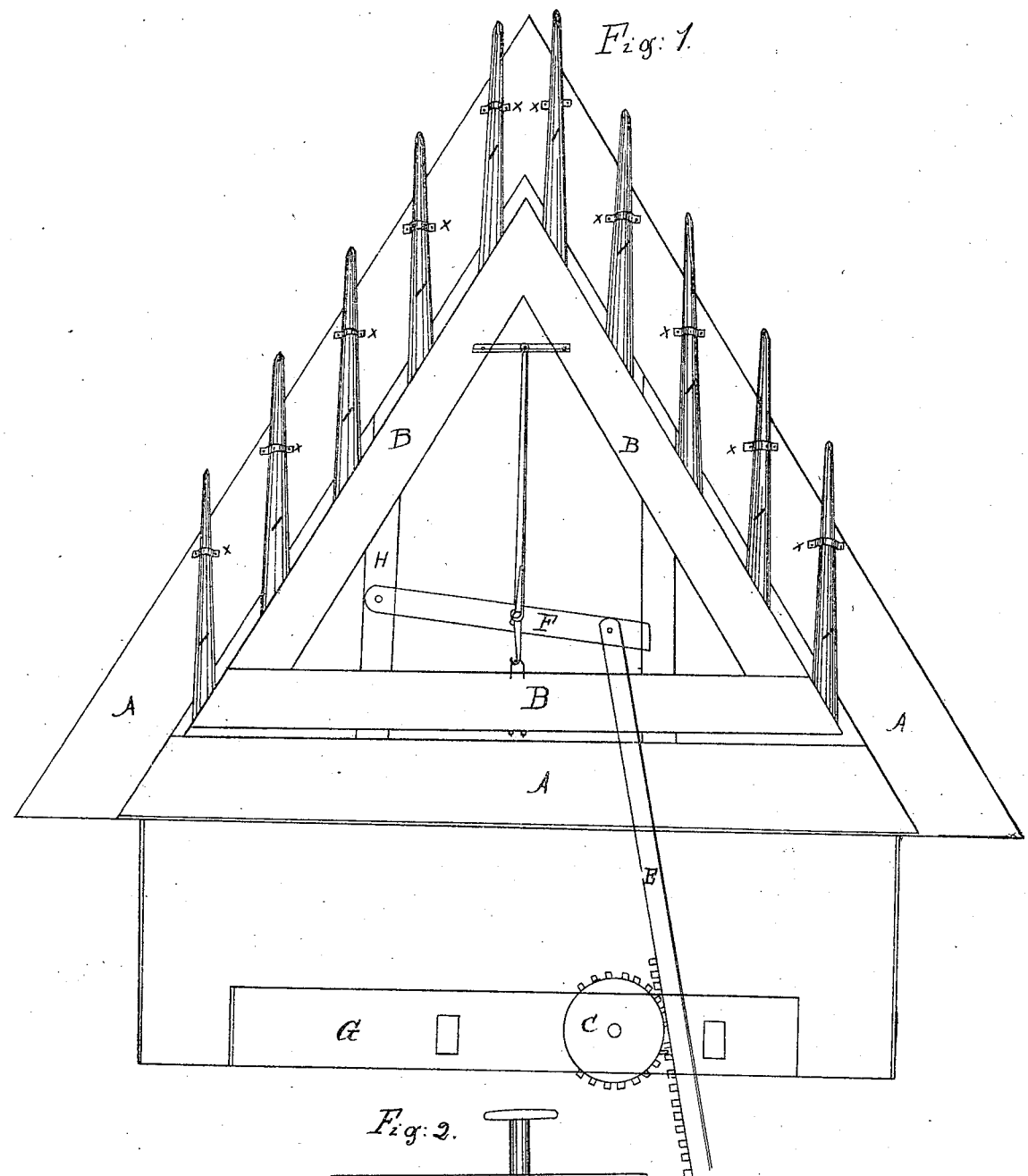

WILSON J. ORR, OF MANORVILLE, PENNSYLVANIA.

IMPROVED COW-CATCHER FOR PREVENTING ACCIDENTS ON RAILROADS.

Specification forming part of Letters Patent No. 72,752, dated December 31, 1867.

*To all whom it may concern:*

Be it known that I, WILSON J. ORR, of Manorville, Armstrong county, State of Pennsylvania, have invented a new and improved method of preventing the loss to life and property arising from cattle on the track getting under the locomotives and cars, by means of an addition to the cow-catchers now in use; and I do hereby declare that the following is a full and exact description of the construction and operation of the same.

The nature of my invention consists in providing an interior sliding frame resting upon the lower bars of the ordinary cow-catcher attached to the locomotives, and so constructed that it may be instantly put forward, with its projecting spikes or iron points, which will enter or be thrust into any animal lying or fallen upon the track, and will prevent the same from getting under the locomotives and throwing them off the track, as frequently occurs now. This sliding frame, with its projecting points, will ordinarily remain back within the cow-catcher, and need only be thrust forward when the engineer deems it necessary. When the obstruction on the track is a log or stone, the cow-catcher can be used as at present. When cattle are down upon the track, these iron or steel points will be thrust into them, and the chief weight of the animals will rest upon the lower bars of the cow-catcher and remain there until the locomotive is stopped, when the sliding frame and point may be drawn back and the animal rolled off the track.

To enable others skilled in the art to make and use my invention, I proceed to describe its construction and operation.

I construct my cow-catcher in any of the usual forms now in use.

A A A in Figure 1 of the accompanying drawing represent the bottom or lower framework of the cow-catcher. B B B represent the interior sliding frame, with the projecting iron points, (marked 1,) which points are firmly fastened in said frame, and rest upon the bars A A, and secured by collars, (marked x x x,) through which they slide when the interior frame is put in motion, the said collars acting as guides to secure a straightforward motion, and to retain the points firmly when thrust forward.

The motion of the sliding frame is produced by means of a pinion-wheel, C, and a ratchet-bar, E, under the ash-pan of the locomotive, attached to lever F, which is secured to bar H of the frame of the cow-catcher.

The bar G, or sill, is under the engine-room, and upon it rest the pinion-wheel and upright shaft. Upon this shaft is placed a brake, such as now in use, by means of which the sliding frame and points are thrust forward by the engineer, and firmly held in its place by a catch on the floor of the engine-room. Upon removing the catch the interior frame can be drawn back within the cow-catcher and remain, as now, when not needed.

Fig. 2 represents pinion and shaft, with the frame in which it is operated.

The spikes or projecting points should be of the best quality of iron or steel, and two and a half inches square as far out as they rest upon the bar A A, and then rounded and sharpened at the point. When thrust forward they should project about fourteen inches beyond the bars A A.

The sliding frame and points may be put back and forward by means of levers instead of by the pinion-wheel and ratchet-bar, as in the accompanying drawing, as this is no part of my invention, and immaterial.

What I claim as my invention, and desire to secure by Letters Patent, is—

The combination, with a locomotive cow-catcher, of an interior sliding frame with projecting spikes or points, when constructed and arranged as herein described.

WILSON J. ORR.

Witnesses:
W. W. HASTINGS,
T. C. McCULLOCH.